(12) United States Patent
Sebastian et al.

(10) Patent No.: US 6,659,070 B2
(45) Date of Patent: Dec. 9, 2003

(54) FUEL INJECTION SYSTEM

(75) Inventors: Thomas Sebastian, Stuttgart (DE); Gernot Wuerfel, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/048,268

(22) PCT Filed: May 19, 2001

(86) PCT No.: PCT/DE01/01914

§ 371 (c)(1),
(2), (4) Date: Apr. 25, 2002

(87) PCT Pub. No.: WO01/90543

PCT Pub. Date: Nov. 29, 2001

(65) Prior Publication Data

US 2002/0134344 A1 Sep. 26, 2002

(30) Foreign Application Priority Data

May 26, 2000 (DE) .......................................... 100 26 323

(51) Int. Cl.⁷ ................................................. F02B 5/00
(52) U.S. Cl. ........................ 123/298; 123/299; 123/305
(58) Field of Search ................................ 123/298, 299, 123/305

(56) References Cited

U.S. PATENT DOCUMENTS

| | | | |
|---|---|---|---|
| 3,572,298 A | | 3/1971 | Onishi et al. |
| 4,958,604 A | | 9/1990 | Hashimoto |
| 5,042,442 A | * | 8/1991 | Laskaris et al. ............. 123/305 |
| 5,170,758 A | | 12/1992 | Chmela |
| 6,334,426 B1 | * | 1/2002 | Sasaki et al. ................ 123/298 |
| 6,334,427 B1 | * | 1/2002 | Nakayama et al. ......... 123/305 |
| 6,363,909 B1 | * | 4/2002 | Tomoda et al. ............. 123/305 |
| 6,390,059 B1 | * | 5/2002 | Shiraishi et al. ............ 123/298 |

FOREIGN PATENT DOCUMENTS

| | | |
|---|---|---|
| DE | 38 08 635 | 9/1989 |
| DE | 196 42 653 | 1/1998 |
| DE | 198 04 463 | 8/1999 |
| JP | 62-139924 | 6/1987 |

* cited by examiner

Primary Examiner—Erick Solis
(74) Attorney, Agent, or Firm—Kenyon & Kenyon

(57) ABSTRACT

A fuel injection system for an internal combustion engine includes a fuel injector which injects fuel into a combustion chamber delimited by a cylinder wall in which a piston is guided, and having a spark plug projecting into the combustion chamber, the fuel injector producing multiple injection jets in the combustion chamber. At least one gap is provided in the injection jets in an area remote from the spark plug.

6 Claims, 3 Drawing Sheets

FUEL INJECTION SYSTEM

FIELD OF THE INVENTION

The present invention relates to a fuel injection system.

BACKGROUND INFORMATION

In internal combustion engines having spark ignition of a compressed fuel mixture with internal formation of the mixture, a "mixture cloud", which must have a certain fuel-air ratio in the ignitable range, is required in an area of the spark plug for stratified charge operation. For this purpose, fuel injectors having nozzles that open toward the inside or the outside and produce a conical jet are used.

For example, German Published Patent Application No. 198 04 463 describes a fuel injection system for internal combustion engines having spark ignition of a compressed fuel mixture; this fuel injection system is provided with at least one fuel injector that injects fuel into a combustion chamber formed by a piston/cylinder arrangement and is equipped with a spark plug projecting into the combustion chamber. The nozzle body of the fuel injector is provided with at least one row of injection holes distributed over the circumference of a nozzle body of the fuel injector. Through controlled injection of fuel through the injection holes, a jet-guided combustion method is implemented by the formation of a mixture cloud, at least one jet being directed in the direction of the spark plug. Other jets ensure that an at least approximately closed, i.e., contiguous mixture cloud is formed.

German Published Patent Application No. 196 42 653 describes a method of forming an ignitable fuel-air mixture. An ignitable fuel-air mixture is formable in the cylinders of direct-injection internal combustion engines, in that fuel is injected into each combustion chamber delimited by a piston, by way of an injector on opening of a nozzle orifice due to a valve element being lifted up from a valve seat surrounding the nozzle orifice. To permit formation of an internal mixture optimized for fuel consumption and emissions at each operating point of the entire engine characteristics map under all operating conditions of the internal combustion engine, for example, in stratified charge operation, the opening stroke of the valve element and the injection time are adjustable.

German Published Patent Application No. 38 08 635 describes a fuel injection device for direct injection of fuel into the cylinder of an internal combustion engine having compression of a fuel mixture. The fuel injection device includes a fuel injector that is situated in the cylinder wall at a distance from the cylinder head and opposite the exhaust opening and has an outlet opening, with the axis of the jet of the injection valve being directed at the area around the spark plug situated in the cylinder head. The fuel injector has a magnetically operated valve needle having helical swirl grooves to produce a swirl flow of the injection jet. The total cross-sectional area of the swirl grooves is smaller by at least one half than the cross-sectional area of the outlet opening, the fuel injector being situated above a flushing opening, and with its jet axis directed at the ignition point situated at the center of the cylinder head.

Air-guided or wall-guided combustion methods are implemented with the injection systems described above. The air-guided combustion method depends to a very great extent on the movement of incoming air, which has the function of conveying an ignitable fuel-air mixture exactly into the electrode area of the spark plug over the entire stratified charge operation range of the engine characteristics map. In the wall-guided combustion method, fuel is carried to the spark plug with the support of more or less fractured combustion chamber geometries with simultaneous formation of the mixture.

Transport of the mixture to the spark plug is very incomplete in wall-guided and air-guided combustion methods in idling operation and in the lower partial load range. In the middle partial load range of operation, it is possible in part only with unjustifiably low manufacturing tolerances of the high-pressure injectors used or the flow guidance through the intake manifold. The inadequate reproducibility is apparent in particular in increased emission of unburned hydrocarbons due to isolated instances of misfiring.

On the other hand, the jet-guided combustion method is usable only above a certain cylinder stroke volume, which is approximately 500 $cm^3$. A certain minimum size may be required for the hole diameter of the injection holes for technical reasons, so that the arrangements described above result in an overly rich mixture in the case of small cylinder stroke volumes. This results in inferior emission values and higher fuel consumption. The lower limit for the hole diameter is currently approximately 0.12 mm. The injection holes are created by the erosion method. The fuel volume injected can be reduced only by decreasing the number of injection holes, but then the geometry of the fuel jet may become less favorable for the flammability of the fuel-air mixture. Therefore, the fuel jet is aimed at the spark plug in these cases.

SUMMARY

The fuel injection system according to the present invention may provide the advantage that due to an area remote from the spark plug being left out in injection, the quantity of fuel injected may be reduced by decreasing the number of injection holes without having to reduce the diameter of the injection holes. Thus, the requirements of a lower fuel demand of internal combustion engines having a small stroke may be taken into account without requiring complicated measures for introducing smaller injection holes into the fuel injector.

The thermal shock load and sooting of the spark plug may be reduced by tangential injection of fuel with respect to the position of the spark plug, so that the spray jets are not aimed directly at the spark plug.

The gap in the jet at the spark plug may permit an igniting of the fuel-air mixture during injection in all areas of the engine characteristics map and in all operating ranges of the internal combustion engine or to inject fuel during ignition.

Through a specific combination of the injection holes and thus the injection jets in the combustion chamber, the installed position of the intake and exhaust valves as well as of the spark plug in the cylinder head may also be taken into account, and the geometry of the combustion chamber depression in the piston may be utilized optimally.

Fuel injectors suitable for the fuel injection system may be manufactured inexpensively without requiring any additional manufacturing measures. In addition, sensitivity to the mounting depth of the spark plug may decrease due to the possible larger diameter of the injection holes.

DETAILED DESCRIPTION

Figure 1:
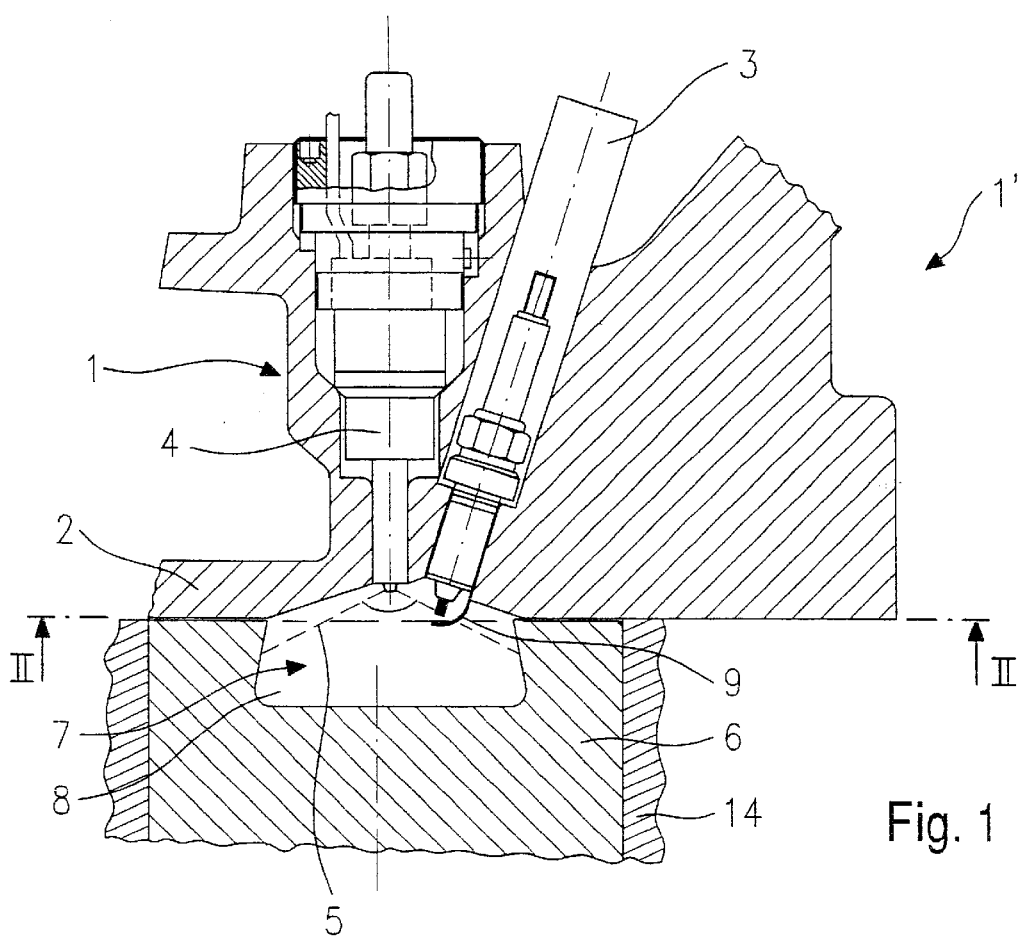
FIG. 1 is a schematic cross-sectional view of a conventional fuel injection system for a jet-guided combustion method.

FIG. 1 is a schematic longitudinal cross-sectional view of a cylinder of an internal combustion engine 1' having one or more cylinders, operating by compression of a fuel mixture. Internal combustion engine 1' has a cylinder head 2, in which a spark plug 3 and a fuel injector 4 are arranged in suitably configured recesses. Since the configuration of both spark plug 3 and fuel injector 4 are conventional, these parts are not described further. The detail of internal combustion engine 1' illustrated in FIG. 1 is referred to below as fuel injection system 1.

Fuel injector 4 injects fuel in a partially closed injection cone 5 into a combustion chamber 7 delimited by cylinder head 2, a piston 6 and a cylinder wall 14, which is indicated only schematically. Combustion chamber 7 is formed in part by a combustion chamber depression 8 formed in piston 6.

Fuel injector 4 and spark plug 3 are arranged relative to one another so that spark plug 3 projects into combustion chamber 7 at a lateral offset from fuel injector 4, spark plug electrodes 9 being arranged in the area of injection cone 5.

The shape of injection cone 5 depends on the configuration of the spray end of fuel injector 4. Fuel injector 4 may be configured as an inwardly opening fuel injector 4 (I valve). Fuel is injected into combustion chamber 7 by energizing a magnetic or piezoelectric actuator, causing a valve needle or a valve closing body connected to it to lift up from a valve body equipped with injection holes. Fuel is thus injected into combustion chamber 7 through fuel injector 4 and the injection holes in the valve body.

Each of FIGS. 2 to 6 is a cross-sectional view of cylinder head 2 of internal combustion engine 1' having fuel injection system 1 as illustrated in FIG. 1. The cross-section is taken along line II—II illustrated in FIG. 1. This illustrates a view of the upper end of piston 6, combustion chamber depression 8 formed there, delimited by edge 11 of the combustion chamber depression illustrated with broken lines, each Figure illustrating different example embodiments of the arrangement of fuel injector 4, spark plug 3, injection jets 10 and a variable number of intake valves 12 and exhaust valves 13.

Injection jets 10 are illustrated as lines in an idealized form. Injection jets 10 have a certain spatial extent, so that adjacent injection jets 10 arranged side by side at an angle β are in mutual contact and form a conical segment-shaped spray geometry in these areas. This partially conical spray pattern is interrupted in the gaps at spark plug 3 or spark plugs 3a, 3b (i.e., in angular areas α) as well as in gaps 15 according to an example embodiment of the present invention.

Figure 2:
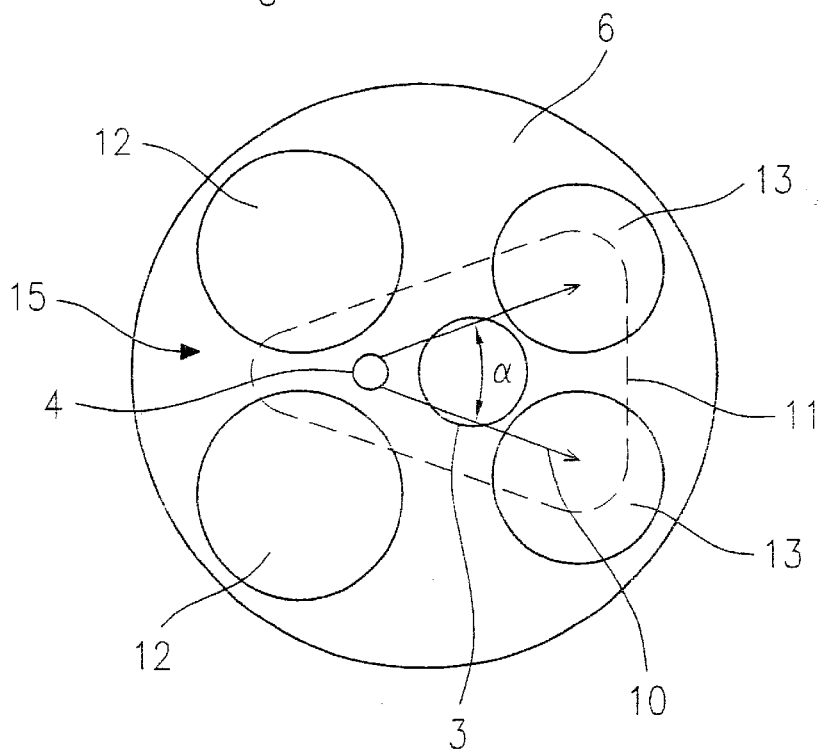
FIG. 2 is a schematic cross-sectional view of a first example embodiment of a fuel injection system according to the present invention taken along the line II—II illustrated in FIG. 1.

FIG. 2 illustrates a first example embodiment of displacement volumes of less than 500 cm$^3$, fuel injector 4 injecting two injection jets 10 into combustion chamber 7 tangentially to spark plug 3. Vertex angle a may amount to approximately 45°.

Combustion chamber depression edge 11 is configured according to the arrangement of two injection jets 10 to support the combustion. The angle recess or gap 15 of injection jets 10 behind spark plug 3 thus amounts to approximately 315°. Two intake valves 12 are also arranged in this area. Two exhaust valves 13 may be arranged in the injection direction. The arrangement of intake and exhaust valves 12, 13 may also be reversed or otherwise different.

Figure 3:
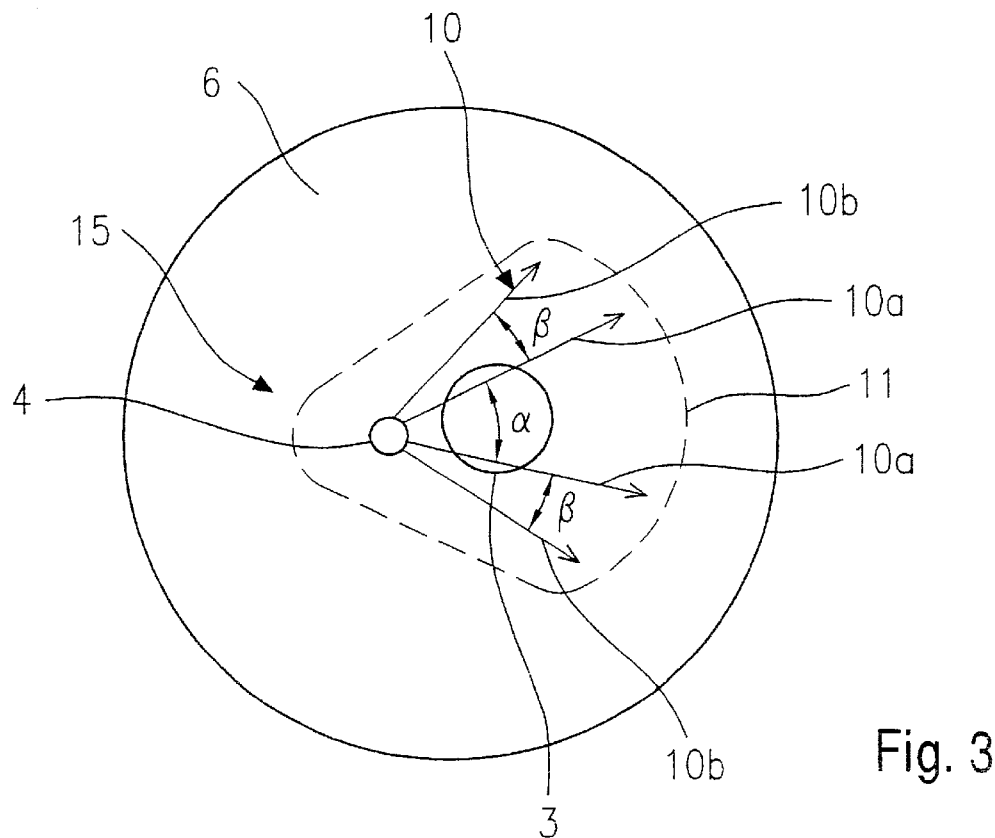
FIG. 3 is a schematic cross-sectional view of a second example embodiment of a fuel injection system according to the present invention taken along the line II—II illustrated in FIG. 1.

FIG. 3 illustrates a second example embodiment of fuel injection system 1 according to the present invention. A total of four injection jets 10 are injected into combustion chamber 7 by fuel injector 4. Inner injection jets 10a are arranged approximately tangentially to spark plug 3, and outer injection jets lob are arranged at an angular distance β of 20° to 30° to inner injection jets 10a. Combustion chamber depression edge 11 is adapted to the arrangement of injection jets 10. In this example embodiment, intake and exhaust valves 12 and 13 are arranged in other areas of cylinder head 2. The arrangement of four injection jets 10 may be suitable for somewhat larger displacement volumes, for which somewhat more fuel may be needed than in the first example embodiment described above. The angle gap not covered by injection jets 10 in the area of gap 15 opposite spark plug 3 amounts to between 250° and 280° in this example embodiment.

Figure 4:
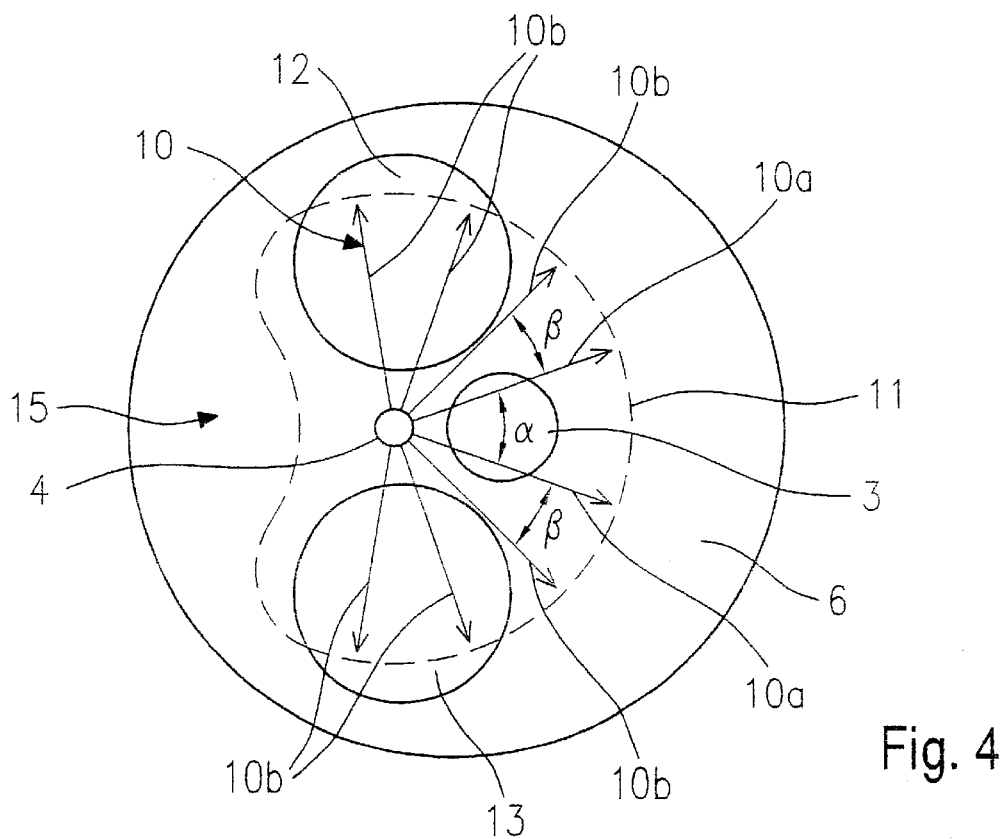
FIG. 4 is a schematic cross-sectional view of a third example embodiment of a fuel injection system according to the present invention taken along the line II—II illustrated in FIG. 1.

FIG. 4 illustrates a third example embodiment of an internal combustion engine 1' having a further increase in displacement, with eight injection jets 10. As in the example embodiments described above, inner injection jets 10a are arranged approximately tangentially to spark plug 3, angle α between them being approximately 45°. Outer injection jets 10b are each arranged at angular distances β of 20° to 30° to inner injection jets 10a. The angle not covered by injection jets 10 in the area of gap 15 opposite spark plug 3 is between 130° and 200° in this example embodiment. Combustion chamber depression edge 11 is adapted to the jet pattern. An intake valve 12 and an exhaust valve 13 may be provided symmetrically with a line on which fuel injector 4 and spark plug 3 may be arranged.

Figure 5:
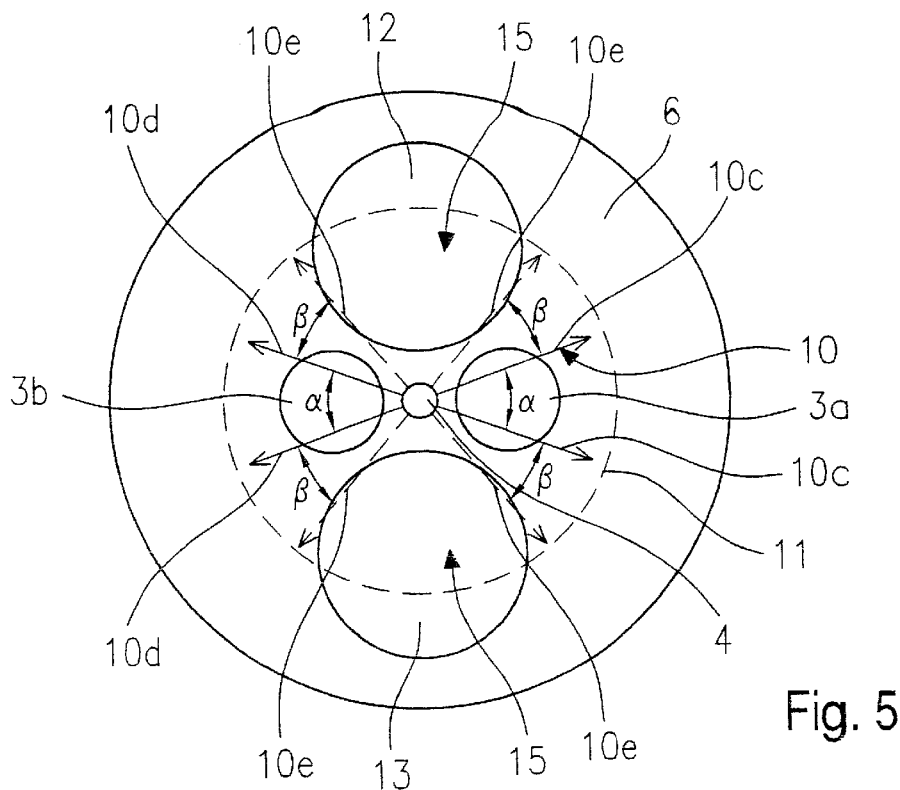
FIG. 5 is a schematic cross-sectional view of a fourth example embodiment of a fuel injection system according to the present invention taken along the line II—II illustrated in FIG. 1.
Figure 6:
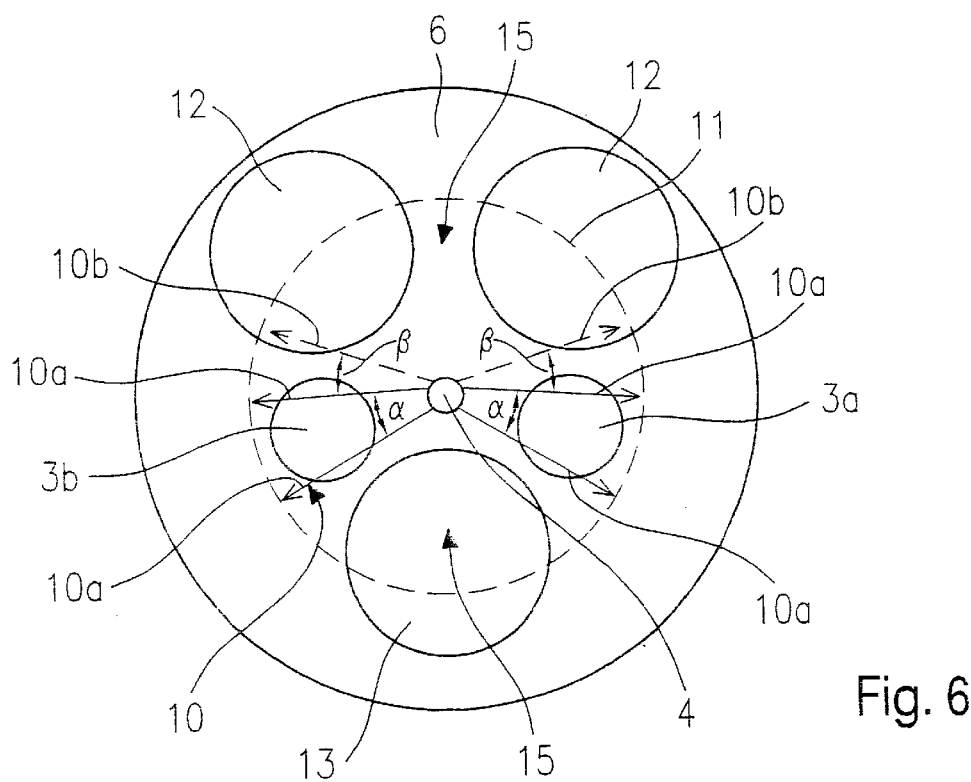
FIG. 6 is a schematic cross-sectional view of a fifth example embodiment of a fuel injection system according to the present invention taken along the line II—II illustrated in FIG. 1.

FIG. 5 and FIG. 6 illustrate variants of the example embodiments of the present invention for fuel injection systems 1 having at least two spark plugs 3a, 3b.

FIG. 5 illustrates a fourth example embodiment of a fuel injection system 1 according to the present invention, having two spark plugs 3a and 3b, which are arranged symmetrically with fuel injector 4. An intake valve 12 and an exhaust valve 13 are arranged so that spark plugs 3a and 3b as well as intake valve 12 and exhaust valve 13 form a cloverleaf arrangement. For small-displacement internal combustion engines 1', it is possible to implement an arrangement having four injection jets 10 that are injected into combustion chamber 7 at an angle a of approximately 45° to one another, approximately tangentially to spark plugs 3a and 3b. For somewhat larger displacement volumes, it is possible to inject a total of eight injection jets 10, which may cover the interspaces between intake and exhaust valves 12, 13 and two spark plugs 3a, 3b. Combustion chamber depression edge 11 is configured to be circular in this example embodiment. Two injection jets 10c are injected approximately tangentially to first spark plug 3a, and two other injection jets 10d are injected approximately tangentially to second spark plug 3b as inner injection jets 10c, 10d. Four outer injection jets 10e are injected at an angular distance β from inner injection jets 10c, lad.

FIG. 6 illustrates a fifth example embodiment of fuel injection system 1 according to the present invention, two intake valves 12 being arranged opposite an exhaust valve 13. Combustion chamber depression edge 11 is configured to be circular. Spark plugs 3a and 3b are surrounded approximately tangentially by injection jets 10, their vertex angle α being 45°. For a slightly larger displacement, six injection jets 10 may also be injected into combustion chamber 7, angular distance β between inner injection jets 10a, which are tangential to spark plugs 3a, 3b, and outer injection jets 10b, shown with broken lines, may be between 20° and 30°.

In the example embodiments of fuel injection system 1 described above, injection jets 10 are oriented so that one or more gaps 15 are formed, spanning an angular range of at least 150° and at most 315°.

The present invention is not limited to the example embodiments described above and may be applied to fuel injection systems 1 having fewer or more injection holes 11, intake and exhaust valves and, for example, several spark plugs and variable displacements, even less than 500 cm³. This may permit fuel injectors, the cone vertex angle of the injection jets of which may assume values between 30° and 150°.

What is claimed is:

1. A fuel injection system for an internal combustion engine, comprising:
    at least one fuel injector configured to inject fuel into a combustion chamber delimited by a cylinder wall in which a piston is guided; and
    a spark plug projecting into the combustion chamber, the fuel injector configured to produce a plurality of injection jets in the combustion chamber;
    wherein the injector jets include at least one gap in an area remote from the spark plug,
    wherein injection holes of the fuel injector are distributed so that at least two injection jets are configured to be injected into the combustion chamber tangentially to the spark plug at a predetermined vertex angle,
    wherein the predetermined vertex angle is approximately 45°, and
    wherein a combustion chamber depression arranged in one end of the piston is configured to permit the injection jets to extend in an area of the combustion chamber depression.

2. A fuel injection system for an internal combustion engine, comprising:
    at least one fuel injector configured to inject fuel into a combustion chamber delimited by a cylinder wall in which a piston is guided; and
    a spark plug projecting into the combustion chamber, the fuel injector configured to produce a plurality of injection jets in the combustion chamber;
    wherein the injector jets include at least one gap in an area remote from the spark plug, and
    wherein at least four injection jets are configured to be injected into the combustion chamber, inner ones of the injection jets configured to be injected tangentially to the spark plug to form a predetermined first angle, and outer ones of the injection jets configured to form a predetermined second angle with the inner injection jets.

3. The fuel injection system according to claim 2, wherein the predetermined second angle is between 20° and 30°.

4. The fuel injection system as recited in claim 2, wherein each of the injection jets has a spatial extension so that adjacent ones of the injection jets contact each other and form a spray-discharge geometry that has a shape of a cone segment.

5. A fuel injection system for an internal combustion engine, comprising:
    at least one fuel injector configured to inject fuel into a combustion chamber delimited by a cylinder wall in which a piston is guided; and
    a spark plug projecting into the combustion chamber, the fuel injector configured to produce a plurality of injection jets in the combustion chamber;
    wherein the injector jets include at least one gap in an area remote from the spark plug, and
    wherein at least four injection jets are configured to be injected into the combustion chamber, two first injection jets configured to be injected tangentially to a first spark plug and two second injection jets configured to be injected tangentially to a second spark plug, and the first injection jets and the second injection jets each configured to form a predetermined first angle.

6. The fuel injection system according to claim 5, wherein at least eight injection jets are configured to be injected into the combustion chamber so that a constant angle is formed between inner ones of the injection jets encompassing the first spark plug and the second spark plug and additional outer ones of the injection jets.

* * * * *

UNITED STATES PATENT AND TRADEMARK OFFICE
CERTIFICATE OF CORRECTION

PATENT NO. : 6,659,070 B2
DATED : December 9, 2003
INVENTOR(S) : Thomas Sebastian et al.

It is certified that error appears in the above-identified patent and that said Letters Patent is hereby corrected as shown below:

<u>Column 4,</u>
Line 9, change "Vertex angle a" to -- Vertex angle $\alpha$ --.
Line 24, change "jets lob" to -- jets 10b --.
Line 63, change "at an angle a" to -- at an angle $\alpha$ --.

Signed and Sealed this

Thirtieth Day of November, 2004

JON W. DUDAS
*Director of the United States Patent and Trademark Office*